(12) United States Patent
Kim et al.

(10) Patent No.: US 10,279,825 B2
(45) Date of Patent: May 7, 2019

(54) TRANSFER OF VEHICLE CONTROL SYSTEM AND METHOD

(71) Applicant: General Electric Company, Schenectady, NY (US)

(72) Inventors: So Young Kim, San Ramon, CA (US); James Brooks, Schenectady, NY (US); Neeraja Subrahmaniyan, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 67 days.

(21) Appl. No.: 15/402,797

(22) Filed: Jan. 10, 2017

(65) Prior Publication Data

US 2018/0196426 A1 Jul. 12, 2018

(51) Int. Cl.
*G05D 1/00* (2006.01)
*B61L 15/00* (2006.01)
(Continued)

(52) U.S. Cl.
CPC ....... *B61L 27/0094* (2013.01); *B61L 15/0027* (2013.01); *B61L 25/025* (2013.01);
(Continued)

(58) Field of Classification Search
CPC .. G05D 1/0011; G05D 1/0038; G05D 1/0055; B61L 25/025; B61L 27/0061;
(Continued)

(56) References Cited

U.S. PATENT DOCUMENTS

| 5,421,687 A | 6/1995 | Wayman |
| 5,448,479 A | 9/1995 | Kemner et al. |

(Continued)

FOREIGN PATENT DOCUMENTS

| CN | 1784701 A | 5/2003 |
| CN | 1910593 B | 9/2011 |

(Continued)

OTHER PUBLICATIONS

M.W. Pollack, "Communications-based signaling: advanced capability for mainline railroads", IEEE Aerospace and Electronic Systems Magazine, vol. 11, issue: 11, pp. 13-18, Nov. 1996.

(Continued)

*Primary Examiner* — Atul Trivedi
(74) *Attorney, Agent, or Firm* — Christopher R. Carroll; The Small Patent Law Group LLC

(57) ABSTRACT

A system includes one or more processors configured to communicatively link a remote-control system disposed off-board a vehicle system with an onboard vehicle control system on the vehicle system. The remote-control system and the onboard vehicle control system are configured to control movement of the vehicle system, wherein the one or more processors are configured to transfer control of the movement of the vehicle system from the remote-control system to the onboard vehicle control system based on one or more of a location, a condition of the vehicle system, or by one or more of a request or condition of an operator or from the onboard vehicle control system to the remote-control system based on the one or more of the location, the condition of the vehicle system, or by the one or more of the request or condition of the operator.

25 Claims, 6 Drawing Sheets

(51) Int. Cl.
   *B61L 25/02* (2006.01)
   *B61L 27/00* (2006.01)
   *B61L 27/04* (2006.01)
(52) U.S. Cl.
   CPC ....... B61L 27/0005 (2013.01); B61L 27/0061 (2013.01); B61L 27/0066 (2013.01); B61L 27/0077 (2013.01); B61L 27/04 (2013.01); G05D 1/0022 (2013.01)
(58) Field of Classification Search
   CPC .. B61L 27/0077; B61L 27/0094; B61L 27/04; B61L 2201/00; B61L 2205/00
   USPC ............................................................ 701/2
   See application file for complete search history.

(56) References Cited

U.S. PATENT DOCUMENTS

| | | | |
|---|---|---|---|
| 5,646,843 | A | 7/1997 | Gudat et al. |
| 6,633,800 | B1 | 10/2003 | Ward et al. |
| 6,822,573 | B2 | 11/2004 | Basir |
| 6,927,694 | B1 | 8/2005 | Smith |
| 6,946,966 | B2 | 9/2005 | Koenig |
| 8,103,398 | B2 | 1/2012 | Duggan et al. |
| 8,255,092 | B2 | 8/2012 | Phillips et al. |
| 8,328,145 | B2 | 12/2012 | Smith |
| 8,340,902 | B1 * | 12/2012 | Chiang ................ G05D 1/0044 340/425.5 |
| 8,406,943 | B2 | 3/2013 | Brand et al. |
| 8,532,842 | B2 | 9/2013 | Smith et al. |
| 8,952,819 | B2 | 2/2015 | Nemat-Nasser |
| 2005/0024212 | A1 | 2/2005 | Hultzsch |
| 2005/0113988 | A1 * | 5/2005 | Nasr ...................... A62C 27/00 701/22 |
| 2010/0179715 | A1 | 7/2010 | Puddy |
| 2010/0222687 | A1 | 9/2010 | Thijs |
| 2010/0305779 | A1 * | 12/2010 | Hassan ................ G01C 17/38 701/2 |
| 2013/0201316 | A1 * | 8/2013 | Binder .................... H04L 67/12 348/77 |
| 2014/0207535 | A1 * | 7/2014 | Stefan ................ G05D 1/0022 705/7.42 |
| 2015/0314755 | A1 * | 11/2015 | Phelan .................. B60R 25/102 701/2 |
| 2016/0194079 | A1 | 7/2016 | Montreuil |
| 2016/0236760 | A1 | 8/2016 | Siesjö et al. |
| 2016/0318467 | A1 * | 11/2016 | Ricci ........................ H04W 4/21 |
| 2016/0321848 | A1 * | 11/2016 | Ricci ........................ H04W 4/21 |
| 2017/0106888 | A1 * | 4/2017 | Shubs, Jr. ........... B61L 27/0061 |

FOREIGN PATENT DOCUMENTS

| | | |
|---|---|---|
| CN | 102902874 A | 1/2013 |
| CN | 104584084 A | 4/2015 |
| CN | 104973054 A | 10/2015 |
| DE | 3826943 A1 | 2/1990 |
| GB | 2465439 A | 5/2010 |
| JP | 2008223879 A | 9/2008 |
| KR | 2015007536 A | 1/2015 |
| WO | 2015066445 A1 | 5/2015 |
| WO | 2015175435 A1 | 11/2015 |
| WO | 2016044678 A1 | 3/2016 |

OTHER PUBLICATIONS

Craig Sayers, "Remote Control", Remote Control Robotics, pp. 41-50, 1999.

B. Stadlmann,"Automation of Operational Train Control on Regional Branch Lines by a Basic Train Control System", Intelligent Transportation Systems Conference, 2006. ITSC '06. IEEE, pp. 50-54, Sep. 17-20, 2006, Toronto.

Zafar et al., "Design and development of effective manual control system for unmanned air vehicle", Computer Research and Development (ICCRD), 2011 3rd International Conference on, pp. 349-353, Mar. 11-13, 2011, Shanghai.

Brooks, J.D., et al., Distributed vehicle system control system and method, GE Co-Pending U.S. Appl. No. 62/327,101, filed Apr. 25, 2016.

Brooks, J.D., Vehicle control system and method for implementing safety procedure, GE Co-Pending U.S. Appl. No. 15/407,363, filed Jan. 17, 2017.

Brooks, J.D., Vehicle communication system, GE Co-Pending U.S. Appl. No. 15/412,692, filed Jan. 23, 2017.

* cited by examiner

TRANSFER OF VEHICLE CONTROL SYSTEM AND METHOD

FIELD

The subject matter described herein relates to transferring control of movement of vehicles.

BACKGROUND

Vehicle systems may be formed from one or more propulsion-generating vehicles and/or non-propulsion generating vehicles that travel together along routes. The movement of these vehicles may be controlled by an operator onboard one of the vehicles.

There may be a desire to remotely control one or more operations of the vehicle. In order for the vehicle system to be remotely controlled by a remote operator, control of the movement of the vehicle system may need to transfer from an onboard control system to a remote-control system or from a remote-control system to an onboard control system. This situation may occur, for example, only when the vehicle system is in a particular location/region, and the vehicle system experiences a certain condition, or based on the request and/or condition of the local or remote operators. For example, the movement of the vehicle system may need to be controlled by an operator onboard the vehicle system if the vehicle system is traveling through a congested area (e.g., a city). Alternatively, the movement of the vehicle system may need to be controlled by a remote operator if the vehicle system is traveling through a non-congested area (e.g., on a plane outside of a city). Alternatively, the movement of the vehicle system may be controlled by an operator onboard the vehicle system if there has been a communication loss between the remote-control system and the vehicle system.

Transferring control of a vehicle system, however, may be a dangerous endeavor. The remote operator remotely controlling the vehicle system needs to be assured that the remote operator has control of the movement of the vehicle system and that local controls are inactivated. Furthermore, an operator onboard and/or near the vehicle system needs to be assured that the remote operator is remotely controlling the vehicle system. Failure to successfully transfer control of the vehicle system or failure to notify one or more operators onboard or off-board the vehicle system may lead to costly errors with potentially catastrophic results.

BRIEF DESCRIPTION

In one embodiment, a system includes one or more processors configured to communicatively link a remote-control system disposed off-board a vehicle system with an onboard vehicle control system on the vehicle system. The remote-control system and the onboard vehicle control system are configured to control movement of the vehicle system, wherein the one or more processors are configured to transfer control of the movement of the vehicle system from the remote-control system to the onboard vehicle control system based on one or more of a location, a condition of the vehicle system, or by one or more of a request or condition of an operator or from the onboard vehicle control system to the remote-control system based on the one or more of the location, the condition of the vehicle system, or by the one or more of the request or condition of the operator.

In one embodiment, a method includes communicatively linking a remote-control system disposed off-board a vehicle system and an onboard vehicle control system on the vehicle system with one or more processors. The remote-control system and the onboard vehicle control system are configured to control movement of the vehicle system. The method includes transferring control of the movement of the vehicle system from the remote-control system to the onboard vehicle control system based on one or more of a location, a condition of the vehicle system, or one or more of a request or condition of an operator or from the onboard vehicle control system to the remote-control system based on the one or more of the location, the condition of the vehicle system, or the one or more of the request or condition of the operator with the one or more processors.

In one embodiment, a system includes one or more processors configured to communicatively link with a vehicle system for remotely controlling movement of the vehicle system. The vehicle system also includes an onboard vehicle control system for locally controlling movement of the vehicle system, wherein the one or more processors are configured to transfer control of the movement of the vehicle system from the remote-control system to the onboard vehicle control system based on one or more of a location, a condition of the vehicle system, or one or more of a request or condition of an operator or from the onboard vehicle control system to the remote-control system based on the one or more of the location, the condition of the vehicle system, or the one or more of the request or condition of the operator.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein relate to systems and methods that enable control of movement of a vehicle system to transfer between one or more of an onboard vehicle control system and a remote-control system in order for one of the onboard vehicle control system or the remote-control system to control the movement of the vehicle system. The systems and methods communicatively link the remote-control system and the onboard vehicle control system and transfer control of the movement of the vehicle system based on one or more of a location, a condition of the vehicle system, or an operator request and/or condition. The location may be a geographic area or designated segment of a route which is either known a priori or calculated according to some track and/or region characteristics. For example, these areas may be based on population density, track work locations, grade crossing locations, vehicle work locations (e.g., pick-up or set-out of vehicles), a designated practice area for manual control of the vehicle system, or the like. The condition may be a fault state of the vehicle system, a communication loss between the vehicle system and the remote-control system, an increase in a rate of fuel consumption, or the like. The systems and methods lock out onboard operator control of the vehicle system, receive an instruction from the remote-control system to test an operation of the vehicle system, and communicate visual data representative of an area outside of the vehicle system when control of the movement of the vehicle system transfers to the remote-control system. The systems and methods automatically stop the vehicle system if needed, activate the onboard vehicle control system and disconnect communication with the remote-control system when control of the movement of the vehicle system transfers to the onboard vehicle control system.

This subject matter may be used in connection with rail vehicles and rail vehicle systems, or alternatively may be used with other types of vehicles. For example, the subject matter described herein may be used in connection with automobiles, trucks, mining vehicles, other off-highway vehicles (e.g., vehicles that are not designed or are not legally permitted for travel on public roadways), aerial vehicles (e.g., fixed wing aircraft, drones or other unmanned aircraft, etc.), or marine vessels.

The vehicle consist or vehicle system can include two or more vehicles mechanically coupled with each other to travel along a route together. Optionally, the vehicle system can include two or more vehicles that are not mechanically coupled with each other, but that travel along a route together. For example, two or more automobiles may wirelessly communicate with each other as the vehicles travel along the route together as a vehicle system to coordinate movements with each other. Optionally, a vehicle system or consist may be formed from a single vehicle.

Figure 1:
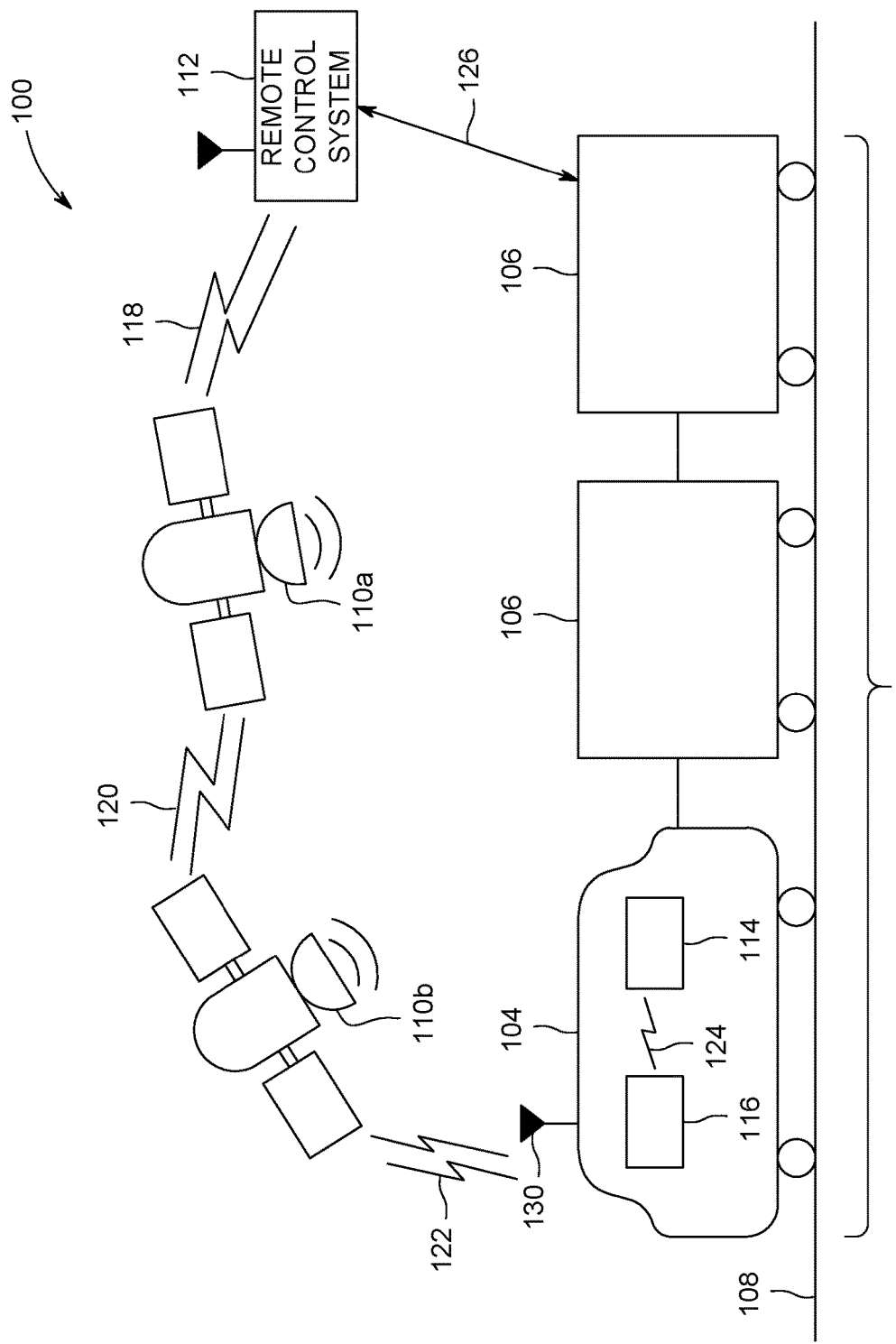
FIG. 1 illustrates a schematic illustration of a system of a vehicle system in accordance with one embodiment.

FIG. 1 illustrates one embodiment of a vehicle control system 100 used to control movement of a vehicle system 102. The illustrated vehicle system 102 includes a propulsion-generating vehicle 104 and non-propulsion-generating vehicles 106 that travel together along a route 108. Although the vehicles 104, 106 are shown as being mechanically coupled with each other, optionally the vehicles may not be mechanically coupled with each other.

The propulsion-generating vehicle 104 is shown as a locomotive, the non-propulsion-generating vehicles 106 are shown as rail cars, and the vehicle system 102 is shown as a train in the illustrated embodiment. Alternatively, the vehicles 104, 106 may represent other vehicles such as automobiles, marine vessels, or the like, and the vehicle system 102 can represent a grouping or coupling of these vehicles. The number and arrangement of the vehicles 104, 106 in the vehicle system 102 are provided as one example and are not intended as limitations on all embodiments of the subject matter described herein.

The vehicle system includes an onboard vehicle control system (OVCS) 114. The OVCS 114 can include hardware circuits or circuitry that include and/or are connected with one or more processors (e.g., one or more microprocessors, field programmable gate arrays, and/or integrated circuits). The OVCS 114 can control or limit movement of the propulsion-generating vehicle 104 and/or the vehicle system 102 that includes the vehicles 104, 106 based on one or more limitations. For example, the OVCS 114 can prevent the vehicles and/or the vehicle system from entering a restricted area, can prevent the vehicle and/or vehicle system from exiting a designated area, can prevent the vehicle and/or vehicle system from traveling at a speed that exceeds an upper speed limit, can prevent the vehicle and/or vehicle system from traveling at a speed that is less than a lower speed limit, can prevent the vehicle and/or vehicle system from traveling according to a designated trip plan generated by an energy management system, or the like. The OVCS 114 will be discussed in more detail with FIG. 2.

The propulsion-generating vehicle 104 includes a control mediation system 116 disposed onboard the vehicle 104. The control mediation system 116 represents hardware circuitry that includes and/or is connected with one or more processors (e.g., microprocessors, controllers, field programmable gate arrays, integrated circuits, or the like). The control mediation system 116 is operably connected with the OVCS 114 of the vehicle 104 by a communication link 124. The communication link 124 may represent a wired or wireless connection. Optionally, the control mediation system 116 may be disposed off-board the vehicle system 102 and may wirelessly communicate with the OVCS 114. Additionally or alternatively, the vehicle system 102 may include one or more additional propulsion-generating vehicles wherein the one or more additional propulsion-generating vehicles may include a control mediation system 116. For example, the vehicle system 102 may include two or more propulsion-generating vehicles 104 wherein each vehicle 104 includes a control mediation system 116. Optionally, the vehicle system 102 may include two or more propulsion-generating vehicles 104 wherein only one vehicle 104 includes a control mediation system 116.

The control mediation system 116 is operably connected with a remote-control system 112 that is disposed off-board the vehicle system 102. The remote-control system 112 remotely controls movement of the vehicle system 102 by communicating movement operational settings to the control mediation system 116 onboard the vehicle 104. Multiple operators at the remote-control system 112 can remotely control the movement of the vehicle system 102. For example, multiple operators may remotely control multiple, different moving heavy vehicles (e.g., trains, vessels, automobiles, or the like).

The remote-control system 112 is separated from the vehicle system 102 by a distance 126. The distance 126 may be 50 meters, 500 meters, 500 kilometers, 5000 kilometers, or the like. The distance 126 between the vehicle system 102 and the remote-control system 112 can be beyond a line of site of an operator of the remote-control system to the vehicle system 102, can extend between different time zones, can extend between different geographical locations (e.g., different town, county, state, country) or the like. For example, an operator of the remote-control system 112 may control the movement of the vehicle system 102 when the operator of the remote-control system 112 is located in New York and the vehicle system 102 is located in Utah. Alternatively, the distance 126 may be within a line a site of an operator of the remote-control system to the vehicle system 102. For example, the distance 126 may be less than 50 meters.

The remote-control system 112 is communicatively linked with the OVCS 114 of the vehicle 104 by communication links 118, 120, 122, 124 established between the remote-control system 112 and the vehicle system 102. For example, the remote-control system 112 communicates control signals to a first satellite 110a by the communication link 118. The first satellite 110a communicates the control signals to a second satellite 110b by the communication link 120. The second satellite 110b communicates the control signals to the control mediation system 116 onboard the vehicle system 102 by the communication link 122. Optionally, less than two or more than two satellites may be used to communicate signals between the remote-control system 112 and the vehicle system 102. Additionally or alternatively, the vehicle system 102 may communicate with the remote-control system 112 with terrestrial communications repeaters (e.g., radio towers). Optionally, the vehicle system 102 and remote-control system 112 may communicate by communication links established between one or more satellites and/or one or more radio towers, or the like. Additionally, the remote-control system 112 is communicatively linked with the OVCS 114 by the communication link 124 established between the control mediation system 116 and the OVCS 114. For example, the control mediation system 116 communicates the control signals between the remote-control system (e.g., by communication links 118, 120, 122) and the OVCS 114 (e.g., by the communication link 124).

The remote-control system 112 communicates control signals to the vehicle system 102 by the communication links 118, 120, 122 in order to remotely control the movement of the vehicle system 102 as the vehicle system 102 travels along the route 108. The control signals dictate the movement operational settings of the vehicle system 102 that include one or more of a throttle notch setting, a brake setting, speed setting or the like. The remote-control system 112 will be described in further detail below with FIG. 3.

The one or more processors of the control mediation system 116 communicatively link the remote-control system 112 disposed off-board the vehicle system with the OVCS 114 disposed onboard the vehicle system 102. The one or more processors of the control mediation system 116 mediate a process of transferring control of the movement of the vehicle system 102 from the remote-control system 112 to the OVCS 114 or from the OVCS 114 to the remote-control system 112. For example, the control mediation system 116 mediates (e.g., manages, arbitrates, or the like) which system controls the vehicle system 102 to ensure the movement of the vehicle system 102 is controlled by a single system at a given time. For example, when control of the movement of the vehicle system is managed by the remote-control system 112, the movement of the vehicle system 102 cannot be controlled autonomously by the OVCS 114 or manually by an operator onboard the vehicle system 102. Additionally, when control of the movement of the vehicle system 102 is managed by the OVCS 114 (manually or autonomously), the movement of the vehicle system 102 cannot be controlled by the remote-control system 112.

Control of the movement of the vehicle system 102 may transfer from the remote-control system 112 to the OVCS 114 or from the OVCS 114 to the remote-control system 112 based on a location and/or region, if vehicle system 102 experiences a certain condition, based on the request and/or condition of the operators of the vehicle system 102, or the like. The location is a designated geographic area or a designated segment of the route 108. The location may be a length of the route (e.g., 10 kilometers, 50 kilometers, or the like), may be a geographic area (e.g., a town, a county, a state, or the like), may be a predetermined or a non-predetermined length and/or geographic area (e.g., determined prior to or during transit of the vehicle system 102) which is either known a priori or calculated according to some track and/or region characteristics, or the like. For example, these areas may be based on population density, track work locations, grade crossing locations, vehicle work locations (e.g., pick-up or set-out of vehicles), a designated practice area for manual control of the vehicle system 102, or the like.

Additionally, control of the movement of the vehicle system 102 may transfer from the remote-control system 112 to the OVCS 114 or from the OVCS 114 to the remote-control system 112 based on a condition of the vehicle system 102. For example, the condition may be a fault state of the vehicle system 102, may be a communication loss between the vehicle system 102 and the remote-control system 112, may be by request of the local or remote operator, may be a lack of alertness or other physical condition of the local and/or remote operator, or the like. Methods determining if control of the vehicle system 102 is to transfer from one system to another, and transferring control of the vehicle system will be discussed below in more detail pertaining to FIGS. 4 and 5.

Figure 2:
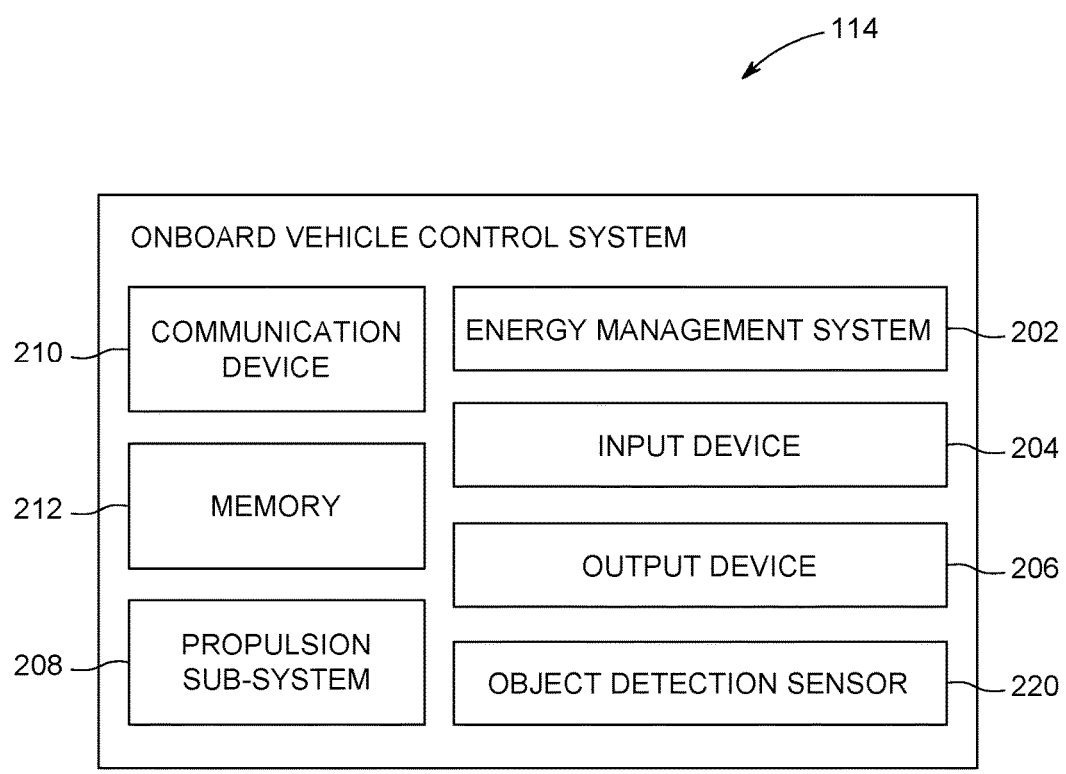
FIG. 2 illustrates a schematic illustration of an onboard vehicle control system for a propulsion-generating vehicle in accordance with one embodiment.

FIG. 2 is a schematic illustration of the onboard vehicle control system (OVCS) 114 disposed onboard the vehicle 104 in accordance with one embodiment. The OVCS 114 controls the movement of the vehicle system 102. The OVCS 114 may be one or more of controlled manually (e.g., by of an operator onboard the vehicle 104) and/or autonomously with an energy management system (EMS) 202. The OVCS 114 can include or represent one or more hardware circuits or circuitry that include, are connected with, or that both include and are connected with one or more processors, controllers or other hardware logic-based devices. For example, an operator onboard the vehicle 104 may manually control movement of the vehicle system 102 by manually controlling the hardware, controllers, devices, or the like of the OVCS 114. Additionally or alternatively, the EMS 202 may autonomously control movement of the vehicle system 102 (e.g., without input by an operator onboard the vehicle system 102) by electrically communicating directions and/or commands to the systems and devices associated with the OVCS 114.

The EMS 202 can include hardware circuits or circuitry that include and/or are connected with one or more processors. The EMS 202 can create a trip plan for trips of the vehicles 104, 106 and/or the vehicle system 102 that includes the vehicles 104, 106. A trip plan may designate operational settings of the propulsion-generating vehicle 104 and/or the vehicle system 102 as a function of one or more of time, location, or distance along a route for a trip. Traveling according to the operational settings designated by the trip plan may reduce fuel consumed and/or emissions generated by the vehicles and/or the vehicle system 102 relative to the vehicles and/or vehicle system traveling according to other operational settings that are not designated by the trip plan. The identities of the vehicles in the vehicle system 102 may be known to the EMS 202 so that the EMS 202 can autonomously control operations of the vehicle system 102. Additionally, the EMS 202 can determine what operational settings to designate for a trip plan to achieve a goal of reducing fuel consumed and/or emissions generated by the vehicle system during the trip.

The OVCS 114 is connected with an input device 204 and an output device 206. The OVCS 114 can receive manual input from an operator of the propulsion-generating vehicle 104 through the input device 204, such as a touchscreen, keyboard, electronic mouse, microphone, or the like. For example, the OVCS 114 can receive manually input changes to the tractive effort, braking effort, speed, power output, and the like, from the input device 204. The OVCS 114 may receive a single instance of an actuation of the input device 204 to initiate the establishment of a communication link (e.g., communication link 124 of FIG. 1) between the OVCS 114 and the control mediation system 116.

The OVCS 114 can present information to the operator of the vehicle 104 using the output device 206, which can represent a display screen (e.g., touchscreen or other screen), speakers, printer, or the like. For example, the OVCS 114 can present the identities and statuses of other vehicles in the vehicle system 102, identities of missing vehicles (e.g., those vehicles from which the vehicle 104 has not received the status), contents of one or more command messages, or the like. The output device 206 provides a notification signal to the operator of the vehicle 104 that automatically informs (e.g., notifies) the operator of the vehicle 104 that control of the movement of the vehicle system 102 has changed. For example, the output device 206 may change colors, change a display format, ring a bell, communicate a vocal command, communicate a sound, or the like that the control of the movement of the vehicle system 102 is and/or has transferred one or more of to the remote-control system 112 or to the OVCS 114. Optionally, the output device 206 can present instructions to the operator onboard the vehicle system 102 from the OVCS 114 that instruct the operator how to manually control the movement of the vehicle system 102. For example, the output device may instruct a throttle notch setting, speed setting, brake setting, or the like, to the operator of the vehicle system 102 in order for the operator onboard the vehicle system 102 to manually control the movement of the vehicle system 102.

The OVCS 114 is connected with a propulsion subsystem 208 of the propulsion-generating vehicle 104. The propulsion subsystem 208 provides tractive effort and/or braking effort of the propulsion-generating vehicle 104. The propulsion subsystem 208 may include or represent one or more engines, motors, alternators, generators, brakes, batteries, turbines, and the like, that operate to propel the propulsion-generating vehicle 104 and/or the vehicle system 102 under the manual or autonomous control that is implemented by the OVCS 114. For example, the OVCS 114 can direct operations of the propulsion subsystem 208 by the OVCS 114 generating control signals autonomously or based on manual input by an operator.

The OVCS 114 is connected with a memory 212 and a communication device 210. The memory 212 can represent an onboard device that electrically and/or magnetically stores data. For example, the memory 212 may represent a computer hard drive, random access memory, read-only memory, dynamic random access memory, an optical drive, or the like. The communication device 210 includes or represents hardware and/or software that is used to communicate with other vehicles in the vehicle system 102. For example, the communication device 210 may include a transceiver and associated circuitry (e.g., antenna 130 of FIG. 1) for wirelessly communicating (e.g., communicating and/or receiving) linking messages, command messages, reply messages, repeat messages, or the like. Optionally, the communication device 210 includes circuitry for communicating messages over a wired connection, such as an electric multiple unit (eMU) line of the vehicle system 102 (not shown), catenary or third rail of electrically powered vehicles, or another conductive pathway between or among the vehicles of the vehicle system 102 and/or between or among vehicles of a different vehicle system.

The OVCS 114 may control the communication device 210 by activating the communication device 210. The OVCS 114 can examine the messages that are received by the communication device 210 from one or more of the control mediation system 116 or other vehicles in the vehicle system 102.

The OVCS 114 is connected with an object detection sensor 220. The object detection sensor 220 can include hardware circuits or circuitry and/or software that include and/or are connected with one or more processors. The detection sensor 220 can obtain sensor data that is indicative of an area outside of the vehicle system 102. For example, the detection sensor 220 may obtain sensor data in an area in front of the vehicle system in a direction of travel of the vehicle system, in an area behind the vehicle system in a direction of travel of the vehicle system, or the like. The detection sensor 220 may include a camera that obtains still and/or motion visual data of an area of the route in the direction of travel of the vehicle system 102 and/or in a direction opposite the direction of travel of the vehicle system 102. For example, the detection sensor 220 may be one or more cameras that capture still images in the front (e.g., in the direction of travel) and the rear (e.g., opposite the direction of travel) of the vehicle system 102. Optionally, the detection sensor 220 may be a radar system that sends and receives pulses reflected off of an object in order to detect a presence of an object in an area outside of the vehicle system 102. Optionally, the detection sensor 220 may be an alternative sensing system that obtains data of an area outside of the vehicle system 102. The detection sensor 220 may obtain data (e.g., visual, statistical, radar, or the like) a distance of 2 meters, 25 meters, 100 meters, 500 meters, 1000 meters, or the like outside of and in a direction away from the vehicle system 102.

The object detection sensor 220 may include one or more sensing devices positioned around the vehicle on one or more of the interior and/or exterior of the vehicle (not shown). For example, a sensing device may be positioned on a front and/or rear end of the vehicle 104 in order to obtain data for the vehicle 104 and/or the vehicle system 102 that travels in a first direction and an opposite second direction (e.g., back and forth). Optionally, one or more sensing devices may be used, and the placement of the one or more sensing devices may vary.

Figure 3:
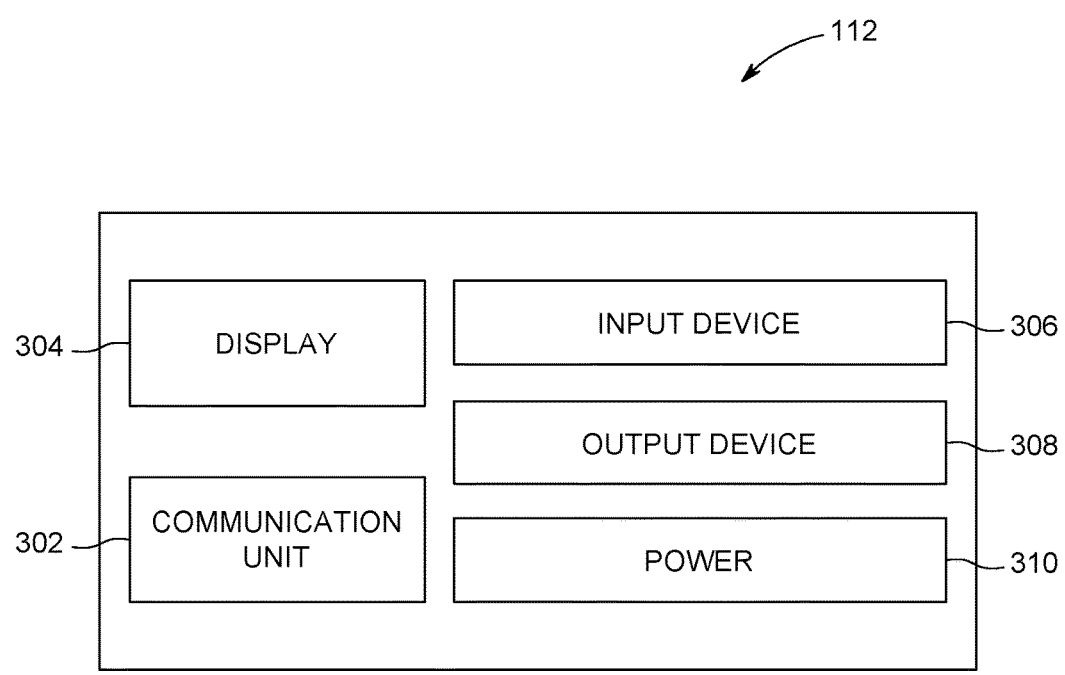
FIG. 3 illustrates a schematic illustration of a remote-control system in accordance with one embodiment.

FIG. 3 is a schematic illustration of the remote-control system 112 of FIG. 1. The remote-control system remotely controls movement of the vehicle system 102. For example, the remote-control system 112 remotely controls movement of the vehicle system 102 by communicating with the control mediation system 116 by the communication links 118, 120, 122. The remote-control system 112 represents hardware circuitry that includes and/or is connected with one or more processors (e.g., microprocessors, controllers, field programmable gate arrays, integrated circuits, or the like).

The remote-control system 112 generates control signals that are communicated by a communication unit 302. The control signals remotely control movement of the vehicle system 102. The communication unit 302 can one or more of send or receive communication signals with the vehicle system by the communication links 118, 120, 122 between the control mediation system 116 and the remote-control system 112. The remote-control system 112 receives one or more of image data and/or sensor data detected by the object detection sensor 220 onboard the propulsion-generating vehicle 104. For example, the remote-control system 112 may receive visual data obtained by the detection sensor 220 and communicated by the control mediation system 116 that is representative of an area outside of the vehicle system 102. Optionally, the remote-control system 112 may receive status notifications such as vehicle system equipment statuses, current vehicle and/or vehicle system operational settings, vehicle system location, or the like, of the vehicles 104, 106 and/or of the vehicle system 102.

The remote-control system 112 can include one or more input devices 306 and/or output devices 308 such as a keyboard, an electronic mouse, stylus, microphone, touch pad, or the like. Additionally or alternatively, the input and/or output devices 306, 308 may be used to communicate with one or more of an operator of the vehicle system 102 or the OVCS 114. The remote-control system 112 can include one or more displays 304 such as a touchscreen, display screen, electronic display, or the like. The displays 304 may visually, graphically, statistically, or the like, display information to the operator of the remote-control system 102. The remote-control system 112 is operably connected with components of the vehicle system 102. Additionally or alternatively, the remote-control system 112 may be operably connected with components or alternative systems onboard and/or off-board the vehicle system 102.

The remote-control system 112 can include a power unit 310. The power unit 310 powers the remote-control unit 112. For example, the power unit 310 may be a battery and/or circuitry that supplies electrical current to power other components of the remote-control system 112. Additionally or alternatively, the power unit 310 may provide electrical power to one or more other systems.

Returning to FIG. 1, the remote-control system 112 is configured to remotely control movement of the vehicle system 102 by sending control signals to the OVCS 114 onboard the vehicle 104 via the control mediation system 116. Additionally, the OVCS 114 is configured to control movement of the vehicle system 102 one or more of autonomously or manually by an operator onboard the vehicle system 102. The one or more processors of the control mediation system 116 control which of the remote-control system 112 or the OVCS 114 controls the movement of the vehicle system at a given time. Additionally, the control mediation system 116 mediates the transfer of control of the movement of the vehicle system from the remote-control system 112 to the OVCS 114 or from the OVCS 114 to the remote-control system 112.

Figure 4:
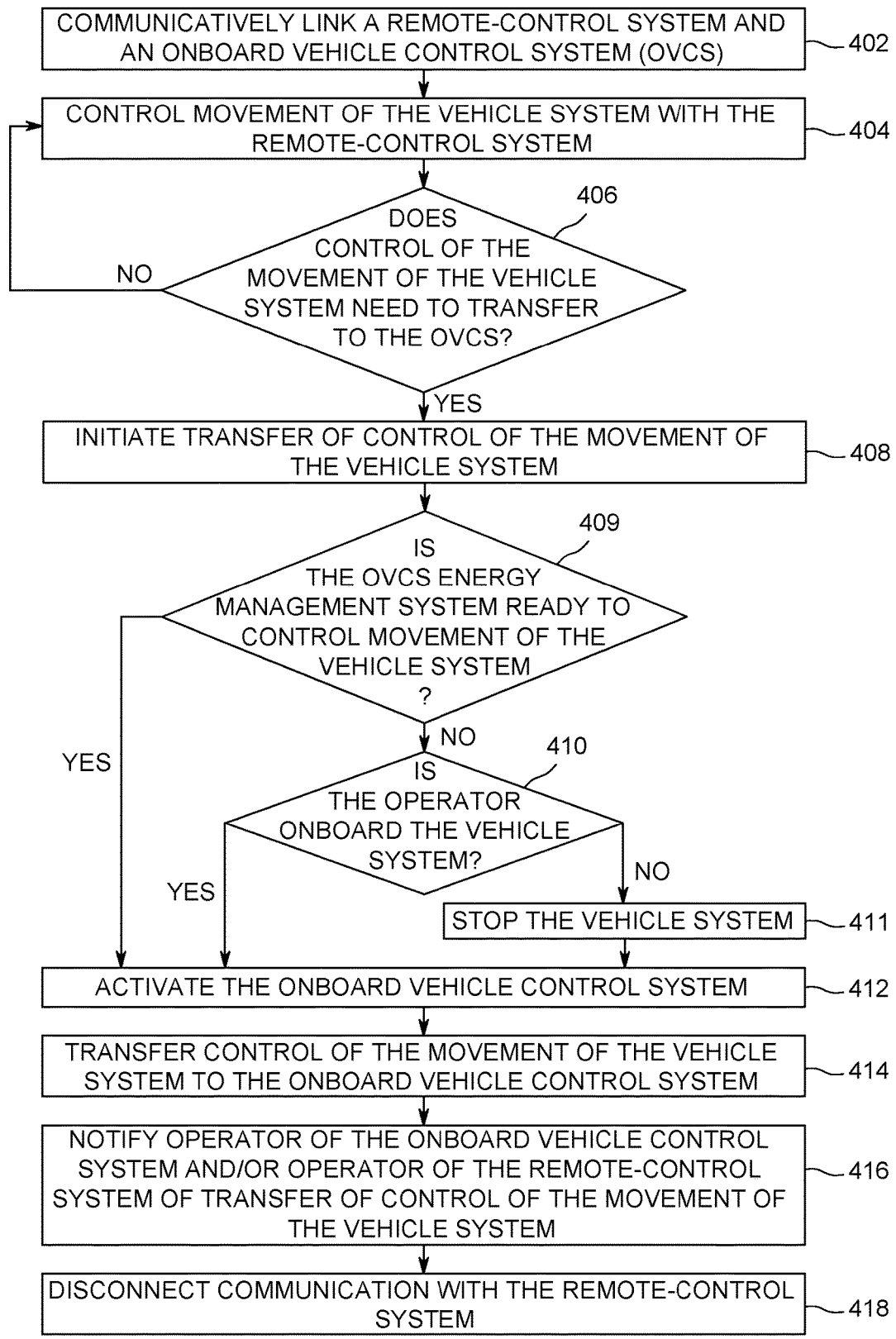
FIG. 4 illustrates a flowchart of a method for transferring control of movement of a vehicle system from a remote-control system to an onboard vehicle control system in accordance with one embodiment.

FIG. 4 illustrates a flowchart of a method 400 for transferring control of the movement of the vehicle system 102 from the remote-control system 112 to the OVCS 114. The steps of the method 400 may be completed one or more of prior to or during the transfer of control of the movement of the vehicle system 102 from the remote-control system 112 to the OVCS 114.

At 402, the remote-control system 112 is communicatively linked to the OVCS 114 via the control mediation system 116. For example, the remote-control system 112 is communicatively linked to the control mediation system 116 by the communication links 118, 120, 122, and the OVCS 114 is communicatively linked to the control mediation system 116 by the communication link 124.

At 404, control of the movement of the vehicle system is controlled by the remote-control system 112. For example, when control of the movement of the vehicle system 102 is controlled by the remote-control system 112, an operator or autonomous controller (e.g., the EMS 202 of FIG. 2) onboard the vehicle system 102 is unable to control the movement of the vehicle system 102. The remote-control system 112 remotely controls the movement of the vehicle system 102 by communicating control signals to the OVCS 114. The control signals dictate the movement operational settings of the vehicle system 102 that include one or more of a throttle notch setting, a brake setting, speed setting or the like. For example, one or more operators of the remote-control system 112 may send a control signal to the OVCS 114 via the control mediation system 116 directing the OVCS 114 to increase the speed of the vehicle system 102 to 75 kilometers per hour. Responsive to receiving the control signal, the OVCS 114 directs the propulsion subsystem (e.g., propulsion subsystem 208 of FIG. 2) to increase the throttle notch setting in order to adhere to the 75 kph speed direction.

At 406, a decision is made to determine if control of the movement of the vehicle system 102 needs to transfer from the remote-control system 112 to the OVCS 114. The decision is based on one or more of a location, a condition of the vehicle system, or an operator (e.g., onboard or off-board) request and/or condition. For example, the control of the movement of the vehicle system 102 may need to transfer to the OVCS 114 if the vehicle system 102 is traveling in a congested region (e.g., a town, a city). Optionally, the location of the vehicle system 102 may be any alternative location that may benefit by the OVCS 114 controlling the movement of the vehicle system 102.

Alternatively, the control of the movement of the vehicle system 102 may transfer to the OVCS 114 if the vehicle system 102 has experienced a fault state. For example, one or more of the onboard vehicle control systems 114 of the propulsion-generating vehicles may have identified an airbrake failure of the propulsion subsystem 208. Optionally, the vehicle system 102 may have experienced a communication loss with the remote-control system 112. For example, one or more of the communication links 118, 120, 122 may have been compromised. Optionally, the condition of the vehicle system 102 may be any alternative condition that would benefit by the OVCS 114 controlling the movement of the vehicle system 102.

Alternatively, the control of the movement of the vehicle system 102 may transfer to the OVCS 114 if the operator of the remote-control system 112 or the operator of the OVCS 114 has initiated a request to transfer control of the movement of the vehicle system 102 to the OVCS 114. For example, the off-board operator of the remote-control system 112 may reach a work end time and need to transfer control of the movement of the vehicle system 102 to the OVCS 114 for manual and/or autonomous control. Optionally, the off-board operator of the remote-control system 112 may have a decrease in alertness prohibiting the off-board operator from safely controlling the movement of the vehicle system 102. Optionally, the request and/or condition of the operator onboard the vehicle system 102 and/or the operator of the remote-control system 112 may be any alternative request or condition that would benefit by the OVCS 114 controlling the movement of the vehicle system.

If control of the movement of the vehicle system 102 does not need to transfer to the OVCS 114, then flow of the method returns to 404 and the remote-control system 112 continues to remotely control the movement of the vehicle system 102. If control of the movement of the vehicle system 102 does need to transfer to the OVCS 114, then flow of the method proceeds to 408.

At 408, transfer of control of the movement of the vehicle system from the remote-control system 112 to the OVCS 114 is initiated. The transfer of control may be initiated by one or more of an operator of the remote-control system 112, an operator onboard the vehicle system 102, or autonomously by the OVCS 114. At 409, a determination is made if the OVCS 114 energy management system (EMS) 202 is ready to autonomously control the movement of the vehicle system 102. For example, the EMS 202 can automatically control the movement of the vehicle system 102 without operator intervention. The EMS 202 may not be ready to autonomously control the movement of the vehicle system 102 if the vehicle system 102 is in a particular location/region, the vehicle system 102 has experienced a certain condition, or based on the request and/or condition of the local or remote operators. For example, the EMS 202 may not be ready to autonomously control the movement of the vehicle system 102 if the vehicle system 102 is traveling through a congested area. Optionally, if the EMS 202 is not ready to control the movement of the vehicle system 102, the EMS 202 may automatically present instructions to the operator onboard the vehicle system instructing the operator how to control the movement of the vehicle system 102. If the EMS 202 is ready to control the movement of the vehicle system, then flow of the method proceeds to 412. If the EMS 202 is not ready to autonomously control the vehicle system 102, then flow of the method proceeds to 410.

At 410, a determination is made if an operator is onboard the vehicle system 102. If an operator is not onboard the vehicle system 102, then flow of the method proceeds to 411 wherein the vehicle system 102 stops in order to allow an operator to board the vehicle system 102 and flow of the method proceeds to 412. If an operator is onboard the vehicle system, flow of the method proceeds directly to step 412.

At 412, the OVCS 114 is activated in order to allow for one or more of manual or autonomous control of the movement of the vehicle system 102. For example, the OVCS 114 may be in a setting for control by only the remote-control system 112 prior to transferring control of the movement of the vehicle system. The OVCS 114 may be activated to a second, different setting to allow for control of the vehicle system by the OVCS 114 (e.g., autonomous and/or manual control). The OVCS 114 may be activated in order to allow the operator onboard the vehicle system to manually control the movement of the vehicle system 102. Optionally, the OVCS 114 may be activated in order to allow the EMS 202 to automatically control the movement of the vehicle system 102 without intervention by the operator.

At 414, the one or more processors of the control mediation system 116 completes the transfer of control of the movement of the vehicle system 102 from the remote-control system 112. For example, the control mediation system 116 may lock out or prevent control signals communicated by the remote-control vehicle 112 from being received by the OVCS 114.

At 416, one or more of the operator onboard the vehicle system 102, the one or more operators of the remote-control system 112, or an operator of an alternative system are notified that the transfer of control of the movement of the vehicle system 102 is complete. For example, the operator onboard the vehicle system 102 may be notified by the output device 206 (of FIG. 2) changing to a different color, changing to a different display format, sounding a bell, communicating a vocal command, communicating a sound, by the OVCS 114 changing and/or dimming the interior lights of the vehicle 104, or the like. Optionally, the operator onboard the vehicle system 102 may be notified by any alternative method. The one or more operators of the remote-control system 112 may be notified that the transfer of control of the movement of the vehicle system 102 is complete by one or more of the display 304 or the output device 308 changing to a different color, changing to a different display format, sounding a bell, communicating a vocal command, communicating a sound, or the like. Optionally, the one or more operators of the remote-control system 112 may be notified by any alternative method.

At 418, the OVCS 114 disconnects communication with the remote-control system 112. For example, the control mediation system 116 breaks the communication links 118, 120, 122 between the remote-control system and the vehicle system 102. Optionally, the communication links 118, 120, 122 may remain intact and the one or more processors of the control mediation system 116 may prohibit control signals communicated by the remote-control system 112 from being delivered to the OVCS 114.

Figure 5:
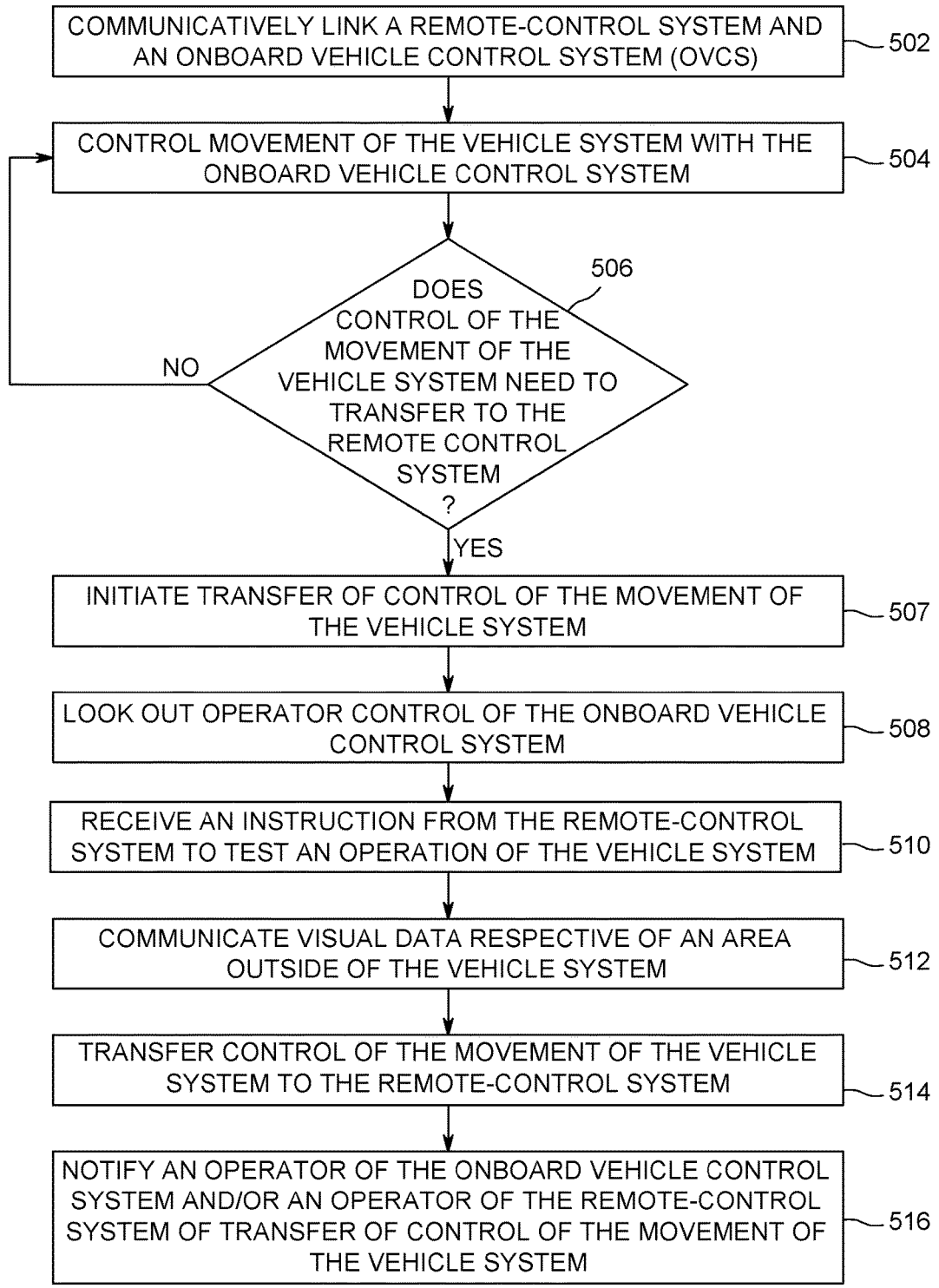
FIG. 5 illustrates a flowchart of a method for transferring control of movement of a vehicle system from an onboard vehicle control system to a remote-control system in accordance with one embodiment.

FIG. 5 illustrates a flowchart method 500 for transferring control of the movement of the vehicle system 102 from the OVCS 114 to the remote-control system 112. The steps of the method 500 may be completed one or more of prior to or during the transfer of control of the movement of the vehicle system 102 from the OVCS 114 to the remote-control system 102.

At 502, the OVCS 114 is communicatively linked to the remote-control system 112 via the control mediation system 116. For example, the OVCS 114 is communicatively linked to the control mediation system 116 by the communication link 124, and the remote-control system 112 is communicatively linked to the control mediation system 116 by the communication links 118, 120, 122.

At 504, control of the movement of the vehicle system 102 is controlled by the OVCS 114. For example, when control of the movement of the vehicle system 102 is controlled by the OVCS 114, one or more operators of the remote-control system 112 are unable to control the movement of the vehicle system 102. The OVCS 114 controls the movement of the vehicle system 102 by directing the propulsion subsystem 208 (of FIG. 2) to change the movement of the vehicle system 102 by one or more of changing a throttle notch setting, a brake setting, speed setting, or the like. For example, the OVCS 114 may autonomously or manually by an operator onboard the vehicle 104 direct propulsion subsystem 208 to decrease the speed of the vehicle system 102 to 45 kilometers per hour. In response, the propulsion subsystem 208 may decrease the throttle notch setting and/or apply the brakes in order to adhere to the 45 kph speed direction.

At 506, a decision is made to determine if control of the movement of the vehicle system 102 needs to transfer from the OVCS 114 to the remote-control system 112. The decision is based on one or more of a location, a condition of the vehicle system, or an operator (e.g., onboard or off-board) request and/or condition. For example, the control of the movement of the vehicle system 102 may need to transfer to the remote-control system if the vehicle system 102 is traveling in a non-congested area (e.g., an open plane with minimal or no natural or manmade obstructions). Optionally, the location of the vehicle system 102 may be any alternative location that would benefit by the remote-control system 112 remotely controlling the movement of the vehicle system 102.

Alternatively, the control of the movement of the vehicle system 102 may transfer to the remote-control system 112 if the vehicle system 102 has not experienced a fault state for a designated threshold amount of time and/or length of travel along the route 108. For example, the OVCS 114 may communicate to one or more of the remote-control system 112 or an alternative system that the status of each vehicle and/or the vehicle system 102 is functioning appropriately for a given amount of time and/or distance of travel. Optionally, the condition of the vehicle system may be any alternative condition that would benefit by the remote-control system 112 remotely controlling of the movement of the vehicle system 102.

Alternatively, the control of the movement of the vehicle system 102 may transfer to the remote-control system 112 if the operator of the OVCS 114 or the operator of the remote-control system 112 has initiated a request to transfer control of the movement. For example, the onboard operator of the OVCS 114 may reach a designated break time and need to transfer control of the movement of the vehicle system 102 to the remote-control system 112 in order to take a designated work break. Optionally, the onboard operator of the OVCS 114 may have a decrease in alertness prohibiting the onboard operator of the OVCS 114 from safely controlling the movement of the vehicle system 102. Optionally, the request and/or condition of the operator onboard the vehicle system 102 and/or the operator of the remote-control system 112 may be any alternative request or condition that would benefit by the remote-control system 112 controlling the movement of the vehicle system 102.

If control of the movement of the vehicle system 102 does not need to transfer to the remote-control system 112, then flow of the method returns to 504 and the OVCS 114 continues to control the movement of the vehicle system 102 (autonomously or manually). If control of the movement of the vehicle system 102 does need to transfer to the remote-control system 112, then flow of the method proceeds to 507.

At 507, transfer of control of the movement of the vehicle system from the OVCS 114 to the remote-control system 112 is initiated. The transfer of control may be initiated by one or more of an operator of the remote-control system 112, an operator onboard the vehicle system 102, or autonomously by the OVCS 114.

At 508, the control mediation system 116 locks out an operator and autonomous control of the EMS 202 onboard the vehicle system 102. For example, the control mediation system 116 may prevent control signals one or more of input by the operator onboard the vehicle control system or autonomously by the OVCS 114 from controlling the movement of the vehicle system 102.

At 510, the OVCS 114 receives an instruction from the remote-control system 112 via the control mediation system 116 to test an operation of the vehicle system 102. For example, the instruction may be to perform an airbrake test, switch headlights on and/or off, or the like.

At 512, the OVCS 114 communicates visual data representative of an area outside of the vehicle system 102 to the remote-control system 112. For example, the object detection sensor 220 (of FIG. 2) may obtain still or motion image data of the area outside of the vehicle system 102 (e.g., in front of, behind, to the side, above, or the like). The OVCS 114 may communicate the obtained visual data to the remote-control system 112 in which the visual data is displayed by the display 304 of the remote-control system 112. The visual data informs the operator of the remote-control system 112 of one or more of the condition, location, region, or the like of the vehicle system 102. For example, the visual data may inform the operator of the remote-control system 112 that the route is clear of any obstructions. Additionally, the visual data informs the operator of the remote-control system 112 if the instruction of Step 510 was received by the OVCS 114 and if the instruction was successfully completed by the OVCS 114. For example, the visual data may inform the operator of the remote-control system 112 that the instruction the turn the headlights on and/or off was received and/or accurately completed.

At 514, the one or more processors of the control mediation system 116 completes the transfer of control of the movement of the vehicle system 102 from the OVCS 114 to the remote-control system 112. For example, the control mediation system 116 may lock out or prevent control signals by the OVCS 114 (manually or autonomously) from controlling the movement of the vehicle system 102.

At 516, one or more of the operator onboard or near the vehicle system 102, the one or more operators of the remote-control system 112, or an operator of an alternative system are notified that the transfer of control of the movement of the vehicle system 102 is complete. For example, the operator onboard the vehicle system 102 may be notified by the output device 206 (of FIG. 2) changing to a different color, changing to a different display format, sounding a bell, communicating a vocal command, communicating a sound, by the OVCS 114 changing and/or dimming the interior lights of the vehicle 104, or the like. Optionally, the operator onboard the vehicle system 102 may be notified by any alternative method. The one or more operators of the remote-control system 112 may be notified that the transfer of control of the movement of the vehicle system 102 is complete by one or more of the display 304 or the output device 308 changing to a different color, changing to a different display format, sounding a bell, communicating a vocal command, communicating a sound, or the like. Optionally, the one or more operators of the remote-control system 112 may be notified by any alternative method.

Figure 6:
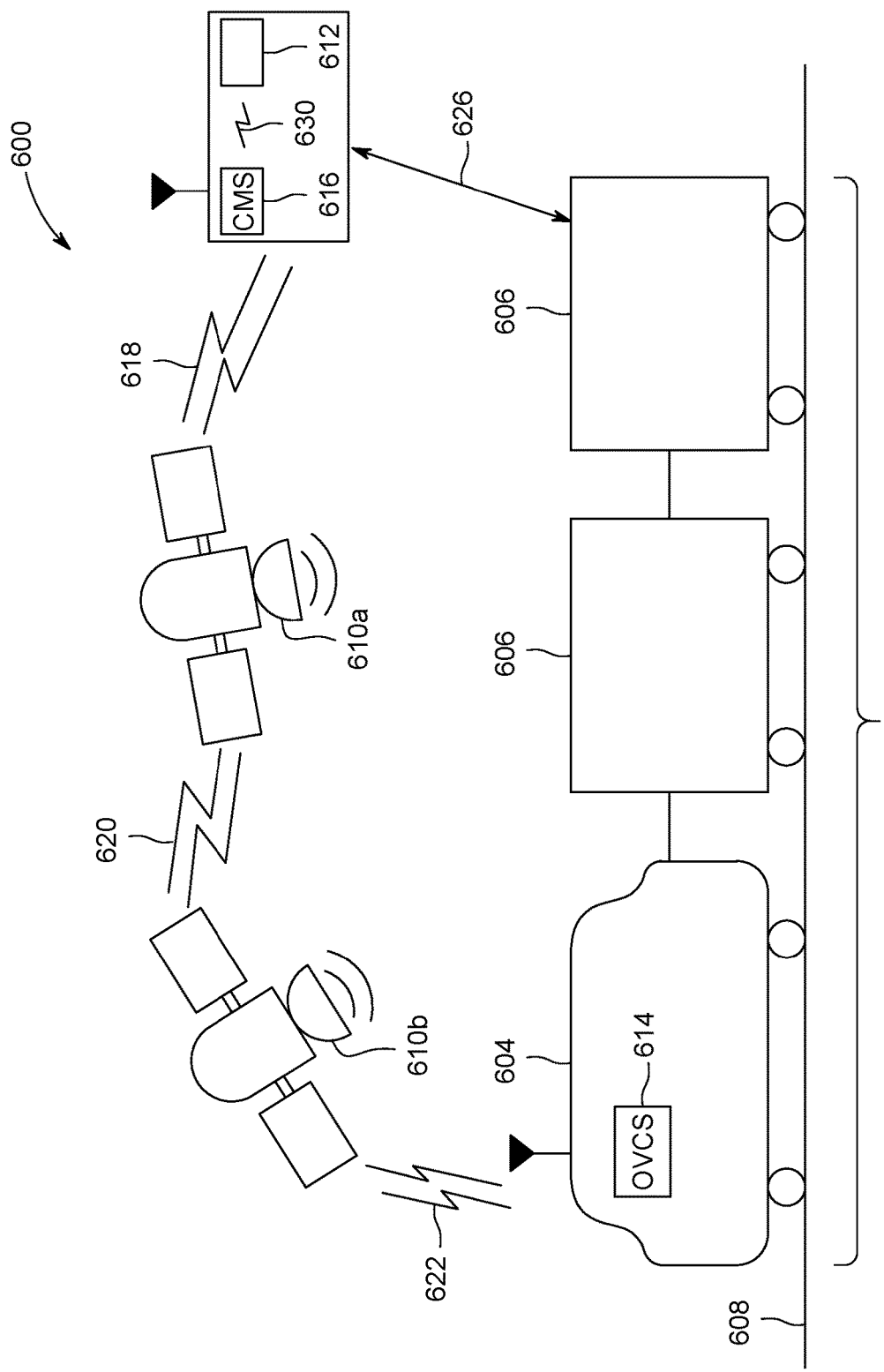
FIG. 6 illustrates a schematic illustration of a system of a vehicle system in accordance with one embodiment.

FIG. 6 illustrates one embodiment of a system 600 that includes a vehicle system 602. The illustrated vehicle system 602 includes a propulsion-generating vehicle 604 and non-propulsion generating vehicles 606. Although the vehicles 604, 606 are shown as being mechanically coupled with each other, optionally the vehicles may not be mechanically coupled with each other.

The propulsion-generating vehicle 604 includes an onboard vehicle control system (OVCS) 614 (corresponding to the OVCS 114 of FIG. 1) disposed onboard the vehicle 604. The OVCS 614 can include hardware circuits or circuitry that include and/or are connected with one or more processors. The OVCS 614 can control or limit movement of the propulsion-generating vehicle 604 and/or the vehicle system 602 that includes the vehicles 604, 606 based on one or more limitations.

The system 600 includes a remote-control system 612 (corresponding to the remote-control system 112 of FIG. 1) disposed off-board the vehicle system 602. The remote-control system 612 remotely controls movement of the vehicle system 602 by communicating movement operational settings to the vehicle system 602. Multiple operators at the remote-control system 612 can remotely control the movement of the vehicle system 602. For example, multiple operators may remotely control multiple, different moving heavy vehicles (e.g., trains, vessels, automobiles, or the like).

The remote-control system 612 includes a control mediation system 616 (corresponding to the control mediation system 116 of FIG. 1). The control mediation system 616 represents hardware circuitry that includes and/or is connected with one or more processors (e.g., microprocessors, controllers, field programmable gate arrays, integrated circuits, or the like). The remote-control system 612 is operably connected with the control mediation system 616 by a communication link 630. The communication link 630 may represent a wired or wireless connection. Additionally, the control mediation system 616 is wirelessly connected with the OVCS 614 onboard the vehicle system 602.

The remote-control system 612 is separated from the vehicle system 602 by a distance 626. The distance 626 may be 50 meters, 500 meters, 500 kilometers, 5000 kilometers, or the like. The distance 626 between the vehicle system 602 and the remote-control system 612 can be beyond a line of site of an operator of the remote-control system 612 to the vehicle system 602, can extend between different time zones, can extend between different geographical locations (e.g., different town, county, state, country) or the like. For example, an operator of the remote-control system 612 may control the movement of the vehicle system 602 when the operator of the remote-control system 612 is located in New York and the vehicle system 602 located in Utah. Alternatively, the distance 626 may be within a line a site of an operator of the remote-control system 612 to the vehicle system 602. For example, the distance 626 may be less than 50 meters.

The remote-control system 612 is communicatively linked with the OVCS 614 of the vehicle 604 by communication links 618, 620, 622, 630 established between the remote-control system 612 and the vehicle system 602. For example, the remote-control system 612 communicates control signals to the control mediation system 616 by the communication link 630. The control mediation system 616 communicates the control signals to a first satellite 610a by the communication link 618. The first satellite 610a communicates the control signals to a second satellite 610b by the communication link 620. The second satellite 610b communicates the control signals to the OVCS 614 by the communication link 622. Optionally, less than two or more than two satellites may be used to communicate signals between the remote-control system 612 and the vehicle system 602. Additionally or alternatively, the vehicle system 602 may communicate with the remote control system 612 with terrestrial communications repeaters (e.g., radio towers). Optionally, the vehicle system 602 and remote control system 612 may communicate by communication links established between one or more satellites and/or one or more radio towers, or the like. Additionally, the remote-control system 612 is communicatively linked with the OVCS 614 by the communication link 630 established between the remote-control system 612 and the vehicle system 602. For example, the control mediation system 616 communicates control signals between the remote-control system (e.g., by communication link 630) and the OVCS 614 (e.g., by the communication links 618, 620, 622).

The remote-control system 612 communicates control signals to the vehicle system 602 by the communication links 618, 620, 622, 630 in order to remotely control the movement of the vehicle system 602 as the vehicle system 602 travels along the route 608. The control signals dictate the movement operational settings of the vehicle system 602 that include one or more of a throttle notch setting, a brake setting, speed setting or the like.

The one or more processors of the control mediation system 616 communicatively link the remote-control system 612 disposed off-board the vehicle system with the OVCS 614 disposed onboard the vehicle system 602. The one or more processors of the control mediation system 616 mediate a process of transferring control of the movement of the vehicle system 602 from the remote-control system 612 to the OVCS 614 or from the OVCS 614 to the remote-control system 612. For example, the control mediation system 616 mediates (e.g., manages, arbitrates, or the like) which system controls the vehicle system 602 to ensure the control of the movement of the vehicle system is controlled by a single system at a given time. For example, when control of the movement of the vehicle system is managed by the remote-control system 612, the movement of the vehicle system 602 cannot be controlled autonomously by the OVCS 114 or manually by an operator onboard the vehicle system 602. Additionally, when control of the movement of the vehicle system 602 is managed by the OVCS 614 (manually or autonomously), the vehicle system 602 cannot be controlled by the remote-control system 612.

Control of the movement of the vehicle system 602 may transfer from the remote-control system 612 to the OVCS 614 or from the OVCS 614 to the remote-control system 612 based on a location, a condition of the vehicle system 602, or an operator request and/or condition. The location is a designated geographic area or a designated segment of the route 608 which is either known a priori or calculated according to some track and/or region characteristics. For example, these areas may be based on population density, track work locations, grade crossing locations, vehicle work locations (e.g., pick-up or set-out of vehicles), a designated practice area for manual control of the vehicle system 602, or the like. The condition may be a fault state of the vehicle system 602, may be a communication loss between the vehicle system 602 and the remote-control system 612, may be an increase or decrease of a rate of fuel consumption above a designated non-zero threshold, or the like. The operator request and/or condition may be based on a level of alertness of the operator onboard the vehicle system 602 or the operator of the remote-control system 612, a designated work break and/or stoppage for one or more operators, or the like.

The remote-control system 612 is configured to remotely control movement of the vehicle system 602 by sending control signals to the OVCS 614 onboard the vehicle 604 via the control mediation system 616. Additionally, the OVCS 614 is configured to control movement of the vehicle system 602 one or more of autonomously or manually by an operator onboard the vehicle system 602. The one or more processors of the control mediation system 616 control which of the remote-control system 612 or the OVCS 614 controls the movement of the vehicle system at a given time. Additionally, the control mediation system 616 mediates the transfer of control of the movement of the vehicle system from the remote-control system 612 to the OVCS 614 or from the OVCS 614 to the remote-control system 612.

In one embodiment of the subject matter described herein, a system is provided that includes one or more processors configured to communicatively link a remote-control system disposed off-board a vehicle system with an onboard vehicle control system on the vehicle system. The remote-control system and the onboard vehicle control system are configured to control movement of the vehicle system, wherein the one or more processors are configured to transfer control of the movement of the vehicle system from the remote-control system to the onboard vehicle control system based on one or more of a location, a condition of the vehicle system, or by one or more of a request or condition of an operator or from the onboard vehicle control system to the remote-control system based on the one or more of the location, the condition of the vehicle system, or by the one or more of the request or condition of the operator.

Optionally, the one or more processors are configured to generate and provide a notification signal to an output device onboard the vehicle system that automatically informs the operator onboard or near the vehicle system of transfer of control of the movement of the vehicle system from the remote-control system to the onboard vehicle control system or from the onboard vehicle control system to the remote-control system.

Optionally, the one or more processors are configured to transfer control of the movement of the vehicle system from the remote-control system to the onboard vehicle control system or transfer control of the movement of the vehicle system to the remote-control system from the onboard vehicle control system responsive to the vehicle system entering the location being a designated geographic area or a designated segment of a route. Optionally, the location is a designated practice area for manual control of the vehicle system by the operator. Optionally the condition is a fault state of the vehicle system. Optionally, the condition is a communication loss between the vehicle system and the remote-control system. Optionally, the condition is a decreased alertness of the operator.

Optionally, the onboard vehicle control system is configured to one or more of automatically control the movement of the vehicle system without operator intervention or automatically present instructions to the operator that instruct the operator how to control the movement of the vehicle system.

Optionally, the one or more processors are configured to lock out operator control of the movement of the vehicle system, receive instructions from the remote-control system to test an operation of the vehicle system, and communicate visual data representative of an area outside of the vehicle system to the remote-control system prior to or during transfer of control of the movement of the vehicle system from the onboard vehicle control system to the remote-control system.

Optionally, the one or more processors are configured to automatically stop the vehicle system, activate the onboard vehicle control system, and disconnect communication with the remote-control system prior to or during transfer of control of the movement of the vehicle system from the remote-control system to the onboard vehicle control system.

In one embodiment of the subject matter described herein, a method is provided that includes communicatively linking a remote-control system disposed off-board a vehicle system and an onboard vehicle control system on the vehicle system with one or more processors. The remote-control system and the onboard vehicle control system are configured to control movement of the vehicle system. The method includes transferring control of the movement of the vehicle system from the remote-control system to the onboard vehicle control system based on one or more of a location, a condition of the vehicle system, or one or more of a request or condition of an operator or from the onboard vehicle control system to the remote-control system based on the one or more of the location, the condition of the vehicle system, or the one or more of the request or condition of the operator with the one or more processors.

Optionally, the one or more processors transfer control of the movement of the vehicle system from the remote-control system to the onboard vehicle control system or transfer control of the movement of the vehicle system to the remote-control system from the onboard vehicle control system responsive to the vehicle system entering the location being a designated geographic area or a designated segment of a route. Optionally, the location is a designated practice area for manual control of the vehicle system by the operator. Optionally, the condition is a fault state of the vehicle system. Optionally, the condition is a communication loss between the vehicle system and the remote-control system. Optionally, the condition is a decreased alertness of the operator.

Optionally, the method includes the onboard vehicle control system one or more of automatically controlling the movement of the vehicle system without operator intervention or automatically presenting instructions to the operator that instruct the operator how to control the movement of the vehicle system.

Optionally, the method includes locking out operator control of the movement of the vehicle system, receiving an instruction from the remote-control system to test an operation of the vehicle system, and communicating visual data representative of an area outside of the vehicle system to the remote-control system prior to or during transferring of control of the movement of the vehicle system from the onboard vehicle control system to the remote-control system.

Optionally, the method includes automatically stopping the vehicle system, activating the onboard vehicle control system, and disconnecting with the remote-control system prior to or during transferring of control of the movement of the vehicle system from the remote-control system to the onboard vehicle control system.

In one embodiment of the subject matter described herein, a system is provided that includes one or more processors configured to communicatively link with a vehicle system for remotely controlling movement of the vehicle system. The vehicle system also includes an onboard vehicle control system for locally controlling movement of the vehicle system, wherein the one or more processors are configured to transfer control of the movement of the vehicle system from the remote-control system to the onboard vehicle control system based on one or more of a location, a condition of the vehicle system, or one or more of a request or condition of an operator or from the onboard vehicle control system to the remote-control system based on the one or more of the location, the condition of the vehicle system, or the one or more of the request or condition of the operator.

Optionally, the one or more processors are configured to transfer control of the movement of the vehicle system from the remote-control system to the onboard vehicle control system or to transfer control of the movement of the vehicle system to the remote-control system from the onboard vehicle control system responsive to the vehicle system entering the location being a designated geographic area or a designated segment of a route. Optionally, the location is a designated practice area for manual control of the vehicle system by the operator. Optionally, the condition is a fault state of the vehicle system. Optionally, the condition is a communication loss between the vehicle system and the remote-control system. Optionally, the condition is a decreased alertness of the operator.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, communication unit, control system, etc) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

Since certain changes may be made in the above-described systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
   one or more processors configured to communicatively link a remote-control system disposed off-board a rail vehicle system with an onboard vehicle control system on the rail vehicle system, the remote-control system and the onboard vehicle control system configured to control movement of the rail vehicle system;
   wherein the one or more processors are configured to transfer control of the movement of the rail vehicle system from the remote-control system to the onboard vehicle control system based on one or more of a location, a condition of the rail vehicle system, or by one or more of a request or condition of an operator, or from the onboard vehicle control system to the remote-control system based on the one or more of the location, the condition of the rail vehicle system, or by the one or more of the request or condition of the operator, wherein control of the movement of the rail vehicle system includes controlling one or more of a throttle setting or a brake setting of the rail vehicle system.

2. The system of claim 1, wherein the one or more processors are configured to generate and provide a notification signal to an output device onboard the rail vehicle system that automatically informs the operator onboard or near the rail vehicle system of transfer of control of the movement of the rail vehicle system from the remote-control system to the onboard vehicle control system or from the onboard vehicle control system to the remote-control system.

3. The system of claim 1, wherein the one or more processors are configured to transfer control of the movement of the rail vehicle system from the remote-control system to the onboard vehicle control system or to transfer control of the movement of the rail vehicle system to the remote-control system from the onboard vehicle control system responsive to the rail vehicle system entering the location being a designated geographic area or a designated segment of a track.

4. The system of claim 1, wherein the location is a designated practice area for manual control of the rail vehicle system by the operator.

5. The system of claim 1, wherein the condition is a fault state of the rail vehicle system.

6. The system of claim 1, wherein the condition is a communication loss between the rail vehicle system and the remote-control system.

7. The system of claim 1, wherein the condition is a decreased alertness of the operator.

8. The system of claim 1, wherein the onboard vehicle control system configured to one or more of automatically control the movement of the rail vehicle system without operator intervention or automatically present instructions to the operator that instruct the operator how to control the movement of the rail vehicle system.

9. The system of claim 1, wherein the one or more processors are configured to lock out operator control of the movement of the rail vehicle system, receive an instruction from the remote-control system to test an operation of the rail vehicle system, and communicate visual data representative of an area outside of the rail vehicle system to the remote-control system prior to or during transfer of control of the movement of the rail vehicle system from the onboard vehicle control system to the remote-control system.

10. The system of claim 1, wherein the one or more processors are configured to automatically stop the rail vehicle system, activate the onboard vehicle control system, and disconnect communication with the remote-control system prior to or during transfer of control of the movement of the rail vehicle system from the remote-control system to the onboard vehicle control system.

11. A method comprising:
communicatively linking a remote-control system disposed off-board a rail vehicle system and an onboard vehicle control system on the rail vehicle system with one or more processors, the remote-control system and the onboard vehicle control system configured to control movement of the rail vehicle system, wherein control of the movement of the rail vehicle system includes controlling one or more of a throttle setting or a brake setting of the rail vehicle system, and
transferring control of the movement of the rail vehicle system from the remote-control system to the onboard vehicle control system based on one or more of a location, a condition of the rail vehicle system, or one or more of a request or condition of an operator or from the onboard vehicle control system to the remote-control system based on the one or more of the location, the condition of the rail vehicle system, or the one or more of the request or condition of the operator with the one or more processors.

12. The method of claim 11, wherein the one or more processors transfer control of the movement of the rail vehicle system from the remote-control system to the onboard vehicle control system or transfer control of the movement of the rail vehicle system to the remote-control system from the onboard vehicle control system responsive to the rail vehicle system entering the location being a designated geographic area of a designated segment of a track.

13. The method of claim 11, wherein the location is a designated practice area for manual control of the rail vehicle system by the operator.

14. The method of claim 11, wherein the condition is a fault state of the rail vehicle system.

15. The method of claim 11, wherein the condition is a communication loss between the rail vehicle system and the remote-control system.

16. The method of claim 11, wherein the condition is a decreased alertness of the operator.

17. The method of claim 11, further comprising the onboard vehicle control system one or more of automatically controlling the movement of the rail vehicle system without operator intervention or automatically presenting instructions to the operator that instruct the operator how to control the movement of the rail vehicle system.

18. The method of claim 11, further comprising locking out operator control of the movement of the rail vehicle system, receiving an instruction from the remote-control system to test an operation of the rail vehicle system, and communicating visual data representative of an area outside of the rail vehicle system to the remote-control system prior to or during transferring of control of the movement of the rail vehicle system from the onboard vehicle control system to the remote-control system.

19. The method of claim 11, further comprising automatically stopping the rail vehicle system, activating the onboard vehicle control system, and disconnecting communication with the remote-control system prior to or during transferring of control of the movement of the rail vehicle system from the remote-control system to the onboard vehicle control system.

20. A system comprising:
one or more processors configured to communicatively link with a rail vehicle system for remotely controlling movement of the rail vehicle system, the rail vehicle system also including an onboard vehicle control system for locally controlling movement of the rail vehicle system,
wherein the one or more processors are configured to transfer control of the movement of the rail vehicle system from a remote-control system to the onboard vehicle control system based on one or more of a location, a condition of the rail vehicle system, or one or more of a request or condition of an operator or from the onboard vehicle control system to the remote-control system based on the one or more of the location, the condition of the rail vehicle system, or the one or more of the request or condition of the operator, wherein control of the movement of the rail vehicle system includes controlling one or more of a throttle setting or brake setting of the rail vehicle system.

21. The system of claim 20, wherein the one or more processors are configured to transfer control of the movement of the rail vehicle system from the remote-control system to the onboard vehicle control system or to transfer control of the movement of the rail vehicle system to the remote-control system from the onboard vehicle control system responsive to the rail vehicle system entering the location being a designated geographic area or a designated segment of a track.

22. The system of claim 20, wherein the location a designated practice area for manual control of the rail vehicle system by the operator.

23. The system of claim 20, wherein the condition as a fault state of the rail vehicle system.

24. The system of claim 20, wherein the condition as a communication loss between the rail vehicle system and the remote-control system.

25. The system of claim 20, wherein the condition is a decreased alertness of the operator.

* * * * *